United States Patent
Yan

(10) Patent No.: US 10,425,197 B2
(45) Date of Patent: Sep. 24, 2019

(54) METHOD FOR ADJUSTING LENGTH OF TIMER AND BASE STATION

(71) Applicant: Huawei Technologies Co., Ltd., Shenzhen, Guangdong (CN)

(72) Inventor: Haidong Yan, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 30 days.

(21) Appl. No.: 15/467,107

(22) Filed: Mar. 23, 2017

(65) Prior Publication Data
US 2017/0201351 A1    Jul. 13, 2017

Related U.S. Application Data

(63) Continuation of application No. PCT/CN2015/078186, filed on May 4, 2015.

(30) Foreign Application Priority Data

Sep. 24, 2014   (CN) .......................... 2014 1 0494766

(51) Int. Cl.
    *H04L 1/18*      (2006.01)
    *H04W 28/18*     (2009.01)
    *H04W 24/08*     (2009.01)
    *H04W 68/02*     (2009.01)

(52) U.S. Cl.
    CPC ............. *H04L 1/188* (2013.01); *H04W 24/08* (2013.01); *H04W 28/18* (2013.01); *H04W 68/02* (2013.01)

(58) Field of Classification Search
    CPC ........ H04L 1/188; H04W 68/02; H04W 24/08
    See application file for complete search history.

(56) References Cited

U.S. PATENT DOCUMENTS

| | | | | |
|---|---|---|---|---|
| 5,732,383 A | * | 3/1998 | Foladare | G08G 1/0104 455/456.5 |
| 6,947,394 B1 | * | 9/2005 | Johansson | H04L 1/1685 370/252 |

(Continued)

FOREIGN PATENT DOCUMENTS

| | | |
|---|---|---|
| CN | 1830162 A | 9/2006 |
| CN | 101965009 A | 2/2011 |

(Continued)

OTHER PUBLICATIONS

"3rd Generation Partnership Project; Technical Specification Group Radio Access Network; RLC protocol specification (Release 4)"; 3GPP TS 25.322 V4.1.0; Jun. 2001; 57 pages.

*Primary Examiner* — Andrew Lai
*Assistant Examiner* — Chuong M Nguyen
(74) *Attorney, Agent, or Firm* — Womble Bond Dickinson (US) LLP

(57) ABSTRACT

Embodiments of the present invention disclose a method for adjusting a length of a timer and a base station, where the method includes: detecting whether a quantity of accessing user equipments UE in a cell exceeds a preset quantity threshold; and increasing a length of a Radio Link Control (RLC) timer by a preset increment when the quantity of accessing UEs exceeds the preset quantity threshold. In the embodiments of the present invention, a radio resource waste can be avoided, and a UE call drop risk can be reduced.

12 Claims, 5 Drawing Sheets

(56) References Cited

U.S. PATENT DOCUMENTS

| | | | |
|---|---|---|---|
| 2004/0032851 A1* | 2/2004 | Wu | H04L 1/1671 370/346 |
| 2004/0165543 A1 | 8/2004 | Nakazawa | |
| 2005/0026597 A1 | 2/2005 | Kim et al. | |
| 2011/0164587 A1* | 7/2011 | Seo | H04L 1/1671 370/329 |
| 2011/0249563 A1 | 10/2011 | Provvedi et al. | |
| 2012/0307668 A1* | 12/2012 | Wiemann | H04W 24/00 370/252 |
| 2013/0039208 A1* | 2/2013 | Jonsson | H04L 41/0816 370/252 |
| 2013/0040650 A1* | 2/2013 | Kondo | H04W 72/085 455/452.1 |
| 2014/0016615 A1 | 1/2014 | Nanri et al. | |
| 2014/0274083 A1* | 9/2014 | Sheik | H04L 1/1858 455/450 |
| 2015/0043488 A1* | 2/2015 | Hakola | H04W 48/16 370/329 |
| 2015/0180786 A1 | 6/2015 | Chen et al. | |

FOREIGN PATENT DOCUMENTS

| | | |
|---|---|---|
| CN | 102726094 A | 10/2012 |
| CN | 103444224 A | 12/2013 |
| CN | 103716114 A | 4/2014 |
| CN | 104301945 A | 1/2015 |
| JP | 2004253934 A | 9/2004 |
| JP | 2005094429 A | 4/2005 |
| JP | 2011211413 A | 10/2011 |
| KR | 20100027925 A | 3/2010 |
| WO | 2017118142 A1 | 7/2017 |

\* cited by examiner

METHOD FOR ADJUSTING LENGTH OF TIMER AND BASE STATION

CROSS-REFERENCE TO RELATED APPLICATIONS

This application is a continuation of International Application No. PCT/CN2015/078186, filed on May 4, 2015, which claims priority to Chinese Patent Application No. 201410494766.X, filed on Sep. 24, 2014. The disclosures of the aforementioned applications are hereby incorporated by reference in their entireties.

TECHNICAL FIELD

Embodiments of the present invention relate to the field of communications technologies, and in particular, to a method for adjusting a length of a timer and a base station.

BACKGROUND

Related parameters of a Radio Link Control (RLC) timer at an acknowledged mode in a Long Term Evolution (LTE) system are basic protocol-defined parameters. These parameters are necessary parameters of an LTE infrastructure network. Whether these parameters are properly configured and can better adapt to a traffic status in the network directly affects network resource occupation and user experience.

Theoretically, Length of a polling retransmission timer=Air interface transmission delay of a protocol data unit (PDU) that carries a polling identifier bit+Scheduling delay of a peer end status report+Air interface transmission delay of a status report; and Length of a status report prohibit timer=Air interface transmission delay of a status report+Scheduling delay of peer end retransmission data+Air interface transmission delay of retransmission data.

The air interface transmission delays in the foregoing formulas may be considered as fixed duration, and length configurations of the two timers are strongly related to the scheduling delay of a status report or the scheduling delay of retransmission data. In a network, a scheduling delay is related to a quantity of users. If the quantity of users is relatively large (large traffic scenario), and a quantity of users for scheduling increases, a time interval at which each user obtains a scheduling opportunity becomes longer. Therefore, the scheduling delay of a status report or retransmission data also becomes longer.

If a configuration value of the polling retransmission timer is smaller than a peer end scheduling interval, before a peer end status report is fed back by obtaining a scheduling opportunity, the polling retransmission timer times out, and this triggers unnecessary retransmission. Moreover, an increase of retransmission times increases a probability of RLC maximum retransmission times, and this causes a call drop. If a configuration value of the status report prohibit timer is smaller the peer end scheduling interval, before peer end retransmission data is fed back by obtaining a scheduling opportunity, the status report prohibit timer times out, and the status report is sent again to the peer end. This wastes resources and may cause the peer end to send retransmission data for a second time.

Downlink data sending is used as an example, that is, an evolved NodeB (eNodeB) sends data to user equipment (UE). A condition when the polling retransmission timer is configured improperly is described as follows:

The eNodeB sends downlink PDU data that carries a polling identifier bit to the UE, and enables the polling retransmission timer at the same time;

the UE receives the downlink PDU data that carries the polling identifier bit and that comes from the eNodeB, and waits for an uplink scheduling opportunity to send a status report to the eNodeB; and a time for which the UE waits for the uplink scheduling opportunity exceeds a length of the polling retransmission timer on an eNodeB side. As a result, the polling retransmission timer on the eNodeB side times out and still does not receive the status report from the UE. Therefore, the eNodeB considers that the UE does not receive the downlink PDU data, and retransmits, to the UE, the downlink PDU data that carries the polling identifier bit. The retransmission in this case is considered as invalid retransmission.

In the prior art, unnecessary RLC retransmission and RLC status report sending are caused, and this wastes radio resources. In addition, an increase of retransmission times increases a risk of reaching RLC maximum retransmission times and causing a UE call drop.

SUMMARY

In view of this, embodiments of the present invention provide a method for adjusting a length of a timer and a base station, so as to avoid a radio resource waste and reduce a UE call drop risk.

According to a first aspect, an embodiment of the present invention provides a base station, including:

a first detection unit, configured to detect whether a quantity of accessing user equipments UE in a cell exceeds a preset quantity threshold; and a first adjustment unit, configured to: increase a length of a Radio Link Control RLC timer by a preset increment when the quantity of accessing UEs exceeds the preset quantity threshold.

With reference to the first aspect, in a first implementation manner of the first aspect, the base station further includes:

a second detection unit, configured to: when the quantity of accessing UEs does not exceed the preset quantity threshold, detect whether the length of the RLC timer is an initial length; and a second adjustment unit, configured to: when the length of the RLC timer is not the initial length, set the length of the RLC timer to the initial length of the RLC timer.

With reference to the first aspect or the first implementation manner of the first aspect, in a second implementation manner of the first aspect, the RLC timer is a polling retransmission timer on a base station side, and/or the RLC timer is a status report prohibit timer on the base station side, and/or the RLC timer is a polling retransmission timer on a UE side, and/or the RLC timer is a status report prohibit timer on the UE side.

With reference to the first aspect, or the first implementation manner of the first aspect, or the second implementation manner of the first aspect, in a third implementation manner of the first aspect, when the RLC timer is the polling retransmission timer on the base station side, and/or the RLC timer is the status report prohibit timer on the base station side, the base station further includes:

a third detection unit, configured to detect whether the polling retransmission timer on the base station side is in a timeout state, and/or detect whether a length of the status report prohibit timer on the base station side is shorter than an uplink scheduling time interval, where if the polling retransmission timer on the base station side is in the timeout state, and/or the length of the status report prohibit timer on the base station side is shorter than the uplink scheduling time interval, the first detection unit detects whether the quantity of accessing UEs exceeds the preset quantity threshold.

With reference to the third implementation manner of the first aspect, in a fourth implementation manner of the first aspect, the first adjustment unit includes:

a detection subunit, configured to: when the quantity of accessing UEs exceeds the preset quantity threshold, detect whether a length of the polling retransmission timer on the base station side reaches a maximum adjustment threshold, and/or detect whether the length of the status report prohibit timer on the base station side reaches the maximum adjustment threshold; and an adjustment subunit, configured to: when the length of the polling retransmission timer on the base station side does not reach the maximum adjustment threshold, and/or the length of the status report prohibit timer on the base station side does not reach the maximum adjustment threshold, increase the length of the polling retransmission timer on the base station side by a first preset increment, and/or increase the length of the status report prohibit timer on the base station side by a second preset increment.

With reference to the fourth implementation manner of the first aspect, in a fifth implementation manner of the first aspect, a length obtained after the length of the polling retransmission timer on the base station side is increased by the first preset increment does not exceed the maximum adjustment threshold, and a length obtained after the length of the status report prohibit timer on the base station side is increased by the second preset increment does not exceed the maximum adjustment threshold.

With reference to the third implementation manner of the first aspect, in a sixth implementation manner of the first aspect, the base station further includes:

a fourth detection unit, configured to: when the quantity of accessing UEs does not exceed the preset quantity threshold, detect whether a length of the polling retransmission timer on the base station side is an initial length, and/or detect whether the length of the status report prohibit timer on the base station side is an initial length; and a third adjustment unit, configured to: when the length of the polling retransmission timer on the base station side is not the initial length, and/or the length of the status report prohibit timer on the base station side is not the initial length, set the length of the polling retransmission timer on the base station side to the initial length of the polling retransmission timer, and/or set the length of the status report prohibit timer on the base station side to the initial length of the status report prohibit timer.

According to a second aspect, an embodiment of the present invention provides a base station, including a processor and a memory, where the memory is configured to store a program instruction, and the processor is configured to invoke the program instruction stored in the memory to execute the following operations:

detecting whether a quantity of accessing user equipments UE in a cell exceeds a preset quantity threshold; and increasing a length of a Radio Link Control RLC timer by a preset increment when the quantity of accessing UEs exceeds the preset quantity threshold.

With reference to the second aspect, in a first implementation manner of the second aspect, operations executed by the processor further include:

when the quantity of UE does not exceed the preset quantity threshold, detecting whether the length of the RLC timer is an initial length; and when the length of the RLC timer is not the initial length, setting the length of the RLC timer to the initial length of the RLC timer.

With reference to the second aspect or the first implementation manner of the second aspect, in a second implementation manner of the second aspect, the RLC timer is a polling retransmission timer on a base station side, and/or the RLC timer is a status report prohibit timer on the base station side, and/or the RLC timer is a polling retransmission timer on a UE side, and/or the RLC timer is a status report prohibit timer on the UE side.

With reference to the second aspect, or the first implementation manner of the second aspect, or the second implementation manner of the second aspect, in a third implementation manner of the second aspect, when the RLC timer is the polling retransmission timer on the base station side, and/or the RLC timer is the status report prohibit timer on the base station side, operations executed by the processor further include:

detecting whether the polling retransmission timer on the base station side is in a timeout state, and/or detecting whether a length of the status report prohibit timer on the base station side is shorter than an uplink scheduling time interval; and if the polling retransmission timer on the base station side is in the timeout state, and/or the length of the status report prohibit timer on the base station side is shorter than the uplink scheduling time interval, detecting whether the quantity of accessing UEs exceeds the preset quantity threshold.

With reference to the third implementation manner of the second aspect, in a fourth implementation manner of the second aspect, the increasing, by the processor, a length of an RLC timer by a preset increment when the quantity of UE exceeds the preset quantity threshold includes:

when the quantity of accessing UEs exceeds the preset quantity threshold, detecting, by the processor, whether a length of the polling retransmission timer on the base station side reaches a maximum adjustment threshold, and/or detecting whether the length of the status report prohibit timer on the base station side reaches the maximum adjustment threshold; and if the length of the polling retransmission timer on the base station side does not reach the maximum adjustment threshold, and/or the length of the status report prohibit timer on the base station side does not reach the maximum adjustment threshold, increasing the length of the polling retransmission timer on the base station side by a first preset increment, and/or increasing the length of the status report prohibit timer on the base station side by a second preset increment.

With reference to the fourth implementation manner of the second aspect, in a fifth implementation manner of the second aspect, a length obtained after the length of the polling retransmission timer on the base station side is increased by the first preset increment does not exceed the maximum adjustment threshold, and a length obtained after the length of the status report prohibit timer on the base station side is increased by the second preset increment does not exceed the maximum adjustment threshold.

With reference to the third implementation manner of the second aspect, in a sixth implementation manner of the second aspect, operations executed by the processor further include:

when the quantity of accessing UEs does not exceed the preset quantity threshold, detecting whether a length of the polling retransmission timer on the base station side is an initial length, and/or detecting whether the length of the status report prohibit timer on the base station side is an initial length; and if the length of the polling retransmission timer on the base station side is not the initial length, and/or the length of the status report prohibit timer on the base station side is not the initial length, setting the length of the polling retransmission timer on the base station side to the initial length of the polling retransmission timer, and/or setting the length of the status report prohibit timer on the base station side to the initial length of the status report prohibit timer.

According to a third aspect, an embodiment of the present invention provides a method for adjusting a length of a timer, including:

detecting whether a quantity of accessing user equipments UE in a cell exceeds a preset quantity threshold; and increasing a length of a Radio Link Control RLC timer by a preset increment when the quantity of accessing UEs exceeds the preset quantity threshold.

With reference to the third aspect, in a first implementation manner of the third aspect, the method further includes:

when the quantity of accessing UEs does not exceed the preset quantity threshold, detecting whether the length of the RLC timer is an initial length; and when the length of the RLC timer is not the initial length, setting the length of the RLC timer to the initial length of the RLC timer.

With reference to the third aspect or the first implementation manner of the third aspect, in a second implementation manner of the third aspect, the RLC timer is a polling retransmission timer on a base station side, and/or the RLC timer is a status report prohibit timer on the base station side, and/or the RLC timer is a polling retransmission timer on a UE side, and/or the RLC timer is a status report prohibit timer on the UE side.

With reference to the third aspect, or the first implementation manner of the third aspect, or the second implementation manner of the third aspect, in a third implementation manner of the third aspect, when the RLC timer is the polling retransmission timer on the base station side, and/or the RLC timer is the status report prohibit timer on the base station side, the method further includes:

detecting whether the polling retransmission timer on the base station side is in a timeout state, and/or detecting whether a length of the status report prohibit timer on the base station side is shorter than an uplink scheduling time interval; and if the polling retransmission timer on the base station side is in the timeout state, and/or the length of the status report prohibit timer on the base station side is shorter than the uplink scheduling time interval, detecting whether the quantity of accessing UEs exceeds the preset quantity threshold.

With reference to the third implementation manner of the third aspect, in a fourth implementation manner of the third aspect, the increasing a length of a Radio Link Control RLC timer by a preset increment when the quantity of UE exceeds the preset quantity threshold includes:

when the quantity of accessing UEs exceeds the preset quantity threshold, detecting whether a length of the polling retransmission timer on the base station side reaches a maximum adjustment threshold, and/or detecting whether the length of the status report prohibit timer on the base station side reaches the maximum adjustment threshold; and if the length of the polling retransmission timer on the base station side does not reach the maximum adjustment threshold, and/or the length of the status report prohibit timer on the base station side does not reach the maximum adjustment threshold, increasing the length of the polling retransmission timer on the base station side by a first preset increment, and/or increasing the length of the status report prohibit timer on the base station side by a second preset increment.

With reference to the fourth implementation manner of the third aspect, in a fifth implementation manner of the third aspect, a length obtained after the length of the polling retransmission timer on the base station side is increased by the first preset increment does not exceed the maximum adjustment threshold, and a length obtained after the length of the status report prohibit timer on the base station side is increased by the second preset increment does not exceed the maximum adjustment threshold.

With reference to the third implementation manner of the third aspect, in a sixth implementation manner of the third aspect, the method further includes:

when the quantity of accessing UEs does not exceed the preset quantity threshold, detecting whether a length of the polling retransmission timer on the base station side is an initial length, and/or detecting whether the length of the status report prohibit timer on the base station side is an initial length; and if the length of the polling retransmission timer on the base station side is not the initial length, and/or the length of the status report prohibit timer on the base station side is not the initial length, setting the length of the polling retransmission timer on the base station side to the initial length of the polling retransmission timer, and/or setting the length of the status report prohibit timer on the base station side to the initial length of the status report prohibit timer.

It can be learned from the foregoing technical solution that the embodiments of the present invention have the following advantages:

In the embodiments of the present invention, a base station detects a quantity of accessing UEs in a cell, and a length of an RLC timer is increased by a preset increment when the quantity of accessing UEs exceeds a preset quantity threshold. That is, a parameter of the RLC timer in the embodiments of the present invention is adjusted according to the quantity of accessing UEs in a current cell, and this can avoid a radio resource waste and reduce a UE call drop risk.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention shall fall within the protection scope of the present invention.

Before the embodiments of the present invention are described, a method for configuring an initial length of an RLC timer is described. In a process in which UE sets up a data radio bearer (DRB) and a signaling radio bearer (SRB), a base station needs to configure an initial length of an RLC timer on a base station side and a UE side. A length of an RLC timer on the base station side is configured by the base station itself, and a length of an RLC timer on the UE side needs to be sent by the base station to the UE by using a radio resource control (RRC) redefinition message. After receiving the message, the UE extracts initial RLC timer parameters, of the SRB or the DRB on the UE side, carried in the message, to complete initial configuration.

In the prior art, after initial length configuration of the RLC timer is completed, the lengths of the RLC timers on the base station side and the UE side are fixed and will not change, and this causes problems of a radio resource waste and a call drop.

Figure 1:
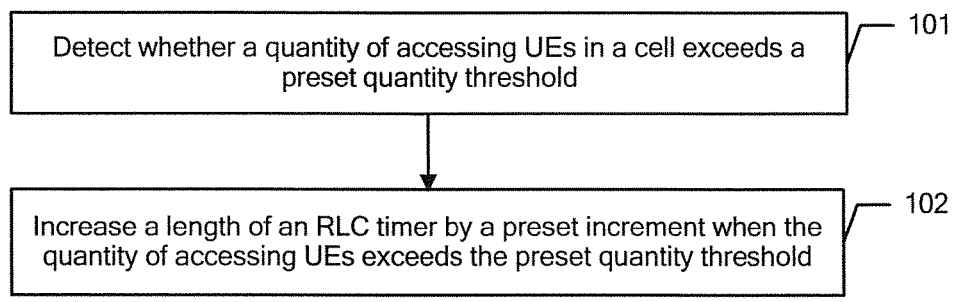
FIG. 1 is a schematic diagram of an embodiment of a method for adjusting a length of a timer according to the present invention.

In the embodiments of the present invention, adaptive adjustment is performed based on the initial lengths of the RLC timers on the base station side and the UE side. First, referring to FIG. 1, an embodiment of a method for adjusting a length of a timer according to the present invention includes the following steps.

101. A base station detects whether a quantity of accessing UEs in a cell exceeds a preset quantity threshold.

In specific implementation, in a phase that the UE performs SRB or DRB transmission, the base station may detect whether the quantity of accessing UEs in the cell exceeds the preset quantity threshold.

102. The base station increases a length of an RLC timer by a preset increment when the quantity of accessing UEs exceeds the preset quantity threshold.

In specific implementation, the preset increment may be any value within a difference range between a maximum length specified in the protocol and a current length of the RLC timer. The base station uses, as the length of the RLC timer, a length that is obtained by increasing the length of the RLC timer by the preset increment.

In this embodiment, a base station adjusts a parameter of an RLC timer according to a quantity of UE in a network, and this can avoid a radio resource waste and reduce a UE call drop risk.

Figure 2:
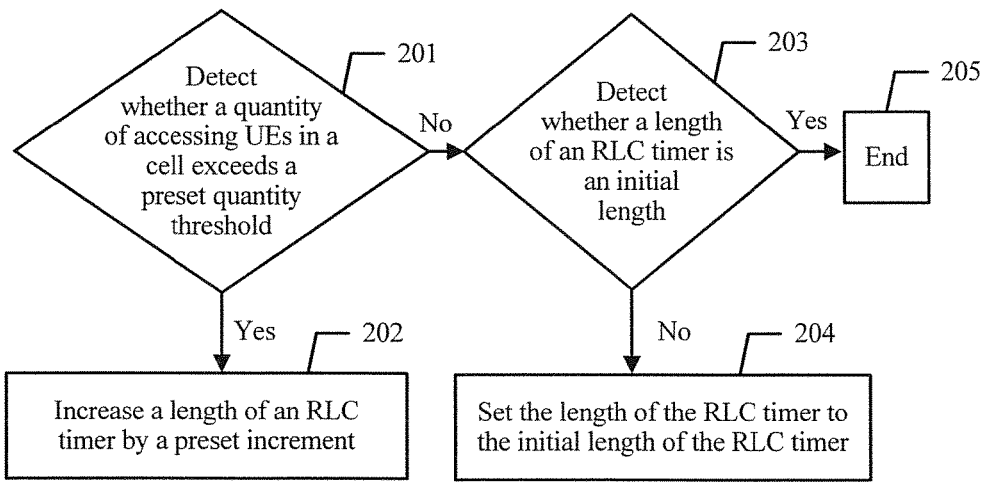
FIG. 2 is a schematic diagram of another embodiment of a method for adjusting a length of a timer according to the present invention.

For ease of understanding, the method for adjusting a length of a timer in the present invention is described by using a specific embodiment. Referring to FIG. 2, the method in this embodiment includes the following steps.

201. A base station detects whether a quantity of accessing UEs in a cell exceeds a preset quantity threshold; and if exceeds, performs step 202; or if does not exceed, performs step 203.

202. The base station increases a length of an RLC timer by a preset increment.

The RLC timer in this embodiment is a polling retransmission timer on a base station side, and/or a status report prohibit timer on the base station side, and/or a polling retransmission timer on a UE side, and/or a status report prohibit timer on the UE side.

The preset increment may be any value within a difference range between a maximum length specified in the protocol and a current length of the RLC timer. Preset increments increased for timers may be a same value or may be different values. After being increased by the preset increment, a length of each timer is still within the maximum length range specified in the protocol.

A preset increment of a length of the polling retransmission timer on the base station side and a preset increment of a length of the status report prohibit timer on the base station side are configured by the base station itself. A preset increment of a length of the polling retransmission timer on the UE side and a preset increment of a length of the status report prohibit timer on the UE side are configured in a way that the base station sends an RRC redefinition message to the UE, and after receiving the message, the UE extracts a parameter, of the RLC timer on the UE side, carried in the message to perform configuration. The base station and/or the UE use/uses, as the length of the RLC timer, a length that is obtained by increasing the length of the RLC timer by the preset increment.

203. The base station detects whether a length of an RLC timer is an initial length; and if no, performs step 204; or if yes, proceeds to step 205 to end processing.

204. The base station sets the length of the RLC timer to the initial length of the RLC timer.

If the length of the RLC timer is not the initial length, it indicates that the base station has adjusted the length of the RLC timer before this adjustment. In this case, the quantity of accessing UEs in the cell does not exceed the preset quantity threshold. Therefore, the length of the polling retransmission timer and/or the status report prohibit timer on the base station side, and/or the length of the polling retransmission timer and/or the status report prohibit timer on the UE side need to be restored to the initial length.

In this embodiment, a base station adjusts a parameter of an RLC timer according to a quantity of UE in a network. A length of the RLC timer is increased by a preset increment when the quantity of UE is greater than a preset quantity threshold; otherwise, when the length of the RLC timer is not an initial length, the length of the RLC timer is set to the initial length. Therefore, the length of the RLC timer can be more adaptive to a network condition, and this avoids invalid RLC retransmission and status report sending, reduces radio resource consumption, and increases a network throughput. Further, a UE call drop because RLC retransmission is performed for the maximum times can be avoided.

Figure 3A:
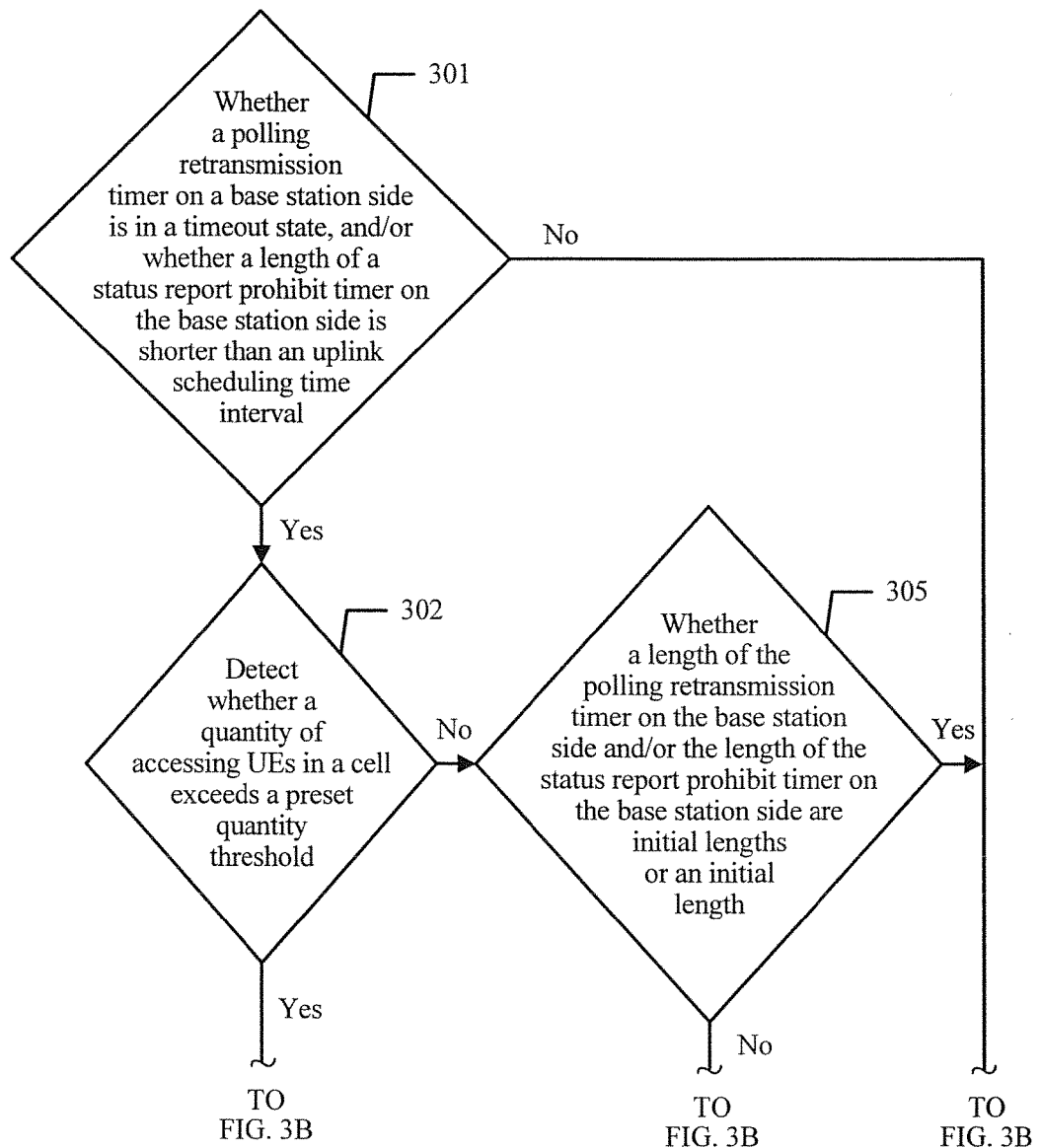
FIG. 3A and FIG. 3B are a schematic diagram of still another embodiment of a method for adjusting a length of a timer according to the present invention.
Figure 3B:
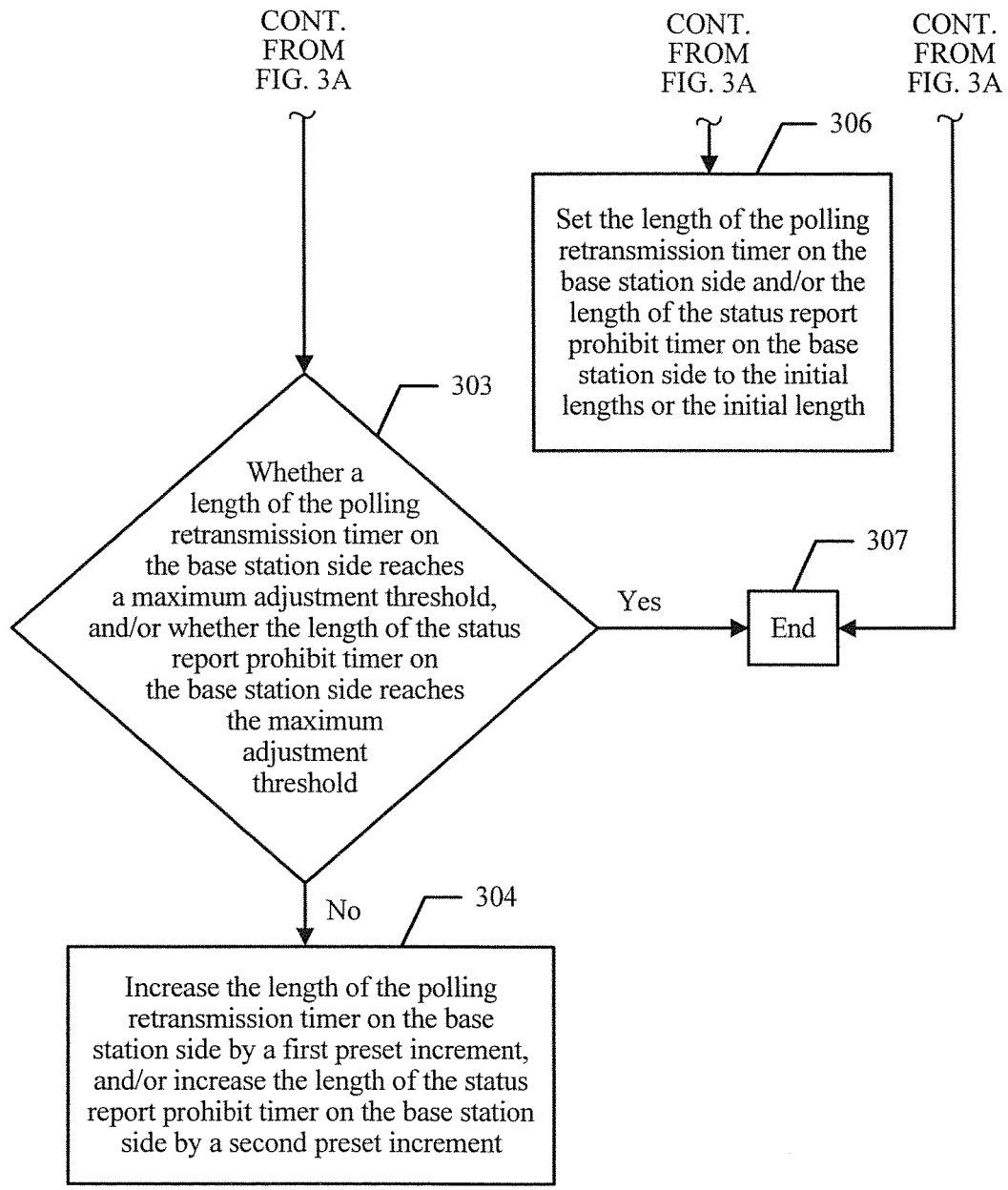

The foregoing embodiment introduces a method for adjusting the lengths of the polling retransmission timer and the status report prohibit timer on the base station side and the UE side. The following introduces another method for adjusting the lengths of the polling retransmission timer and the status report prohibit timer only on the base station side. Referring to FIG. 3A and FIG. 3B, the method in this embodiment includes the following steps.

301. Detect whether the polling retransmission timer on the base station side is in a timeout state, and/or detect whether a length of the status report prohibit timer on the base station side is shorter than an uplink scheduling time interval; and if yes, perform step 302; otherwise, perform step 307 and end processing.

The foregoing uplink scheduling time interval is a time interval at which the base station schedules data for a same user in two consecutive times.

In this embodiment, a step of determining a length status of the RLC timer on the base station side is added, thereby making an adjustment granularity more precise, and making adjustment to the RLC timer more adaptive to a current status requirement of the base station.

302. Detect whether a quantity of accessing UEs in a cell exceeds a preset quantity threshold; and if yes, perform step 303; otherwise, perform step 305.

303. Detect whether a length of the polling retransmission timer on the base station side reaches a maximum adjustment threshold, and/or detect whether the length of the status report prohibit timer on the base station side reaches the maximum adjustment threshold; and if no, perform step 304; otherwise, perform step 307 and end processing.

304. Increase the length of the polling retransmission timer on the base station side by a first preset increment, and/or increase the length of the status report prohibit timer on the base station side by a second preset increment.

The first preset increment and the second preset increment may be a same value, or may be different values. A length obtained after the length of the polling retransmission timer on the base station side is increased by the first preset increment does not exceed the maximum adjustment threshold. Similarly, a length obtained after the length of the status report prohibit timer on the base station side is increased by the second preset increment does not exceed the maximum adjustment threshold.

305. Detect whether a length of the polling retransmission timer on the base station side and/or the length of the status report prohibit timer on the base station side are initial lengths or is an initial length; and if no, perform step 306; otherwise, perform step 307 and end processing.

306. Set the length of the polling retransmission timer on the base station side and/or the length of the status report prohibit timer on the base station side to the initial lengths or the initial length.

If the length of the polling retransmission timer on the base station side and/or the length of the status report prohibit timer on the base station side are not the initial lengths or is not the initial length, it indicates that the base station has adjusted the lengths of these timers. In this step, the length of the polling retransmission timer on the base station side and/or the length of the status report prohibit timer on the base station side are/is restored to the initial lengths or the initial length.

In specific implementation, optionally, the polling retransmission timer on the base station side is in the timeout state. If the quantity of accessing UEs in this case exceeds the preset quantity threshold, whether the length of the polling retransmission timer on the base station side reaches a maximum threshold is detected. If the maximum threshold is not reached, the length of the polling retransmission timer on the base station side is increased by the first preset increment. If the quantity of accessing UEs in this case does not exceed the preset quantity threshold, whether the length of the polling retransmission timer on the base station side is the initial length is detected. If no, the length of the polling retransmission timer on the base station side is set to the initial length of the polling retransmission timer.

Optionally, the length of the status report prohibit timer on the base station side is shorter than the uplink scheduling time interval. If the quantity of accessing UEs in this case exceeds the preset quantity threshold, whether the length of the status report prohibit timer on the base station side reaches the maximum threshold is detected. If the maximum threshold is not reached, the length of the status report prohibit timer on the base station side is increased by the second preset increment. If the quantity of accessing UEs in this case does not exceed the preset quantity threshold, whether the length of the status report prohibit timer on the base station side is the initial length is detected. If no, the length of the status report prohibit timer on the base station side is set to the initial length of the status report prohibit timer.

Optionally, the polling retransmission timer on the base station side is in the timeout state and the length of the status report prohibit timer on the base station side is shorter than the uplink scheduling time interval. If the quantity of accessing UEs in this case exceeds the preset quantity threshold, whether the length of the polling retransmission timer on the base station side exceeds the maximum threshold and whether the length of the status report prohibit timer on the base station side reaches the maximum threshold need to be detected. Then, the length, of the polling retransmission timer on the base station side, that does not reach the maximum threshold is increased by the first preset increment, and the length, of the status report prohibit timer on the base station side, that does not reach the maximum threshold is increased by the second preset increment. If the quantity of accessing UEs in this case does not exceed the preset quantity threshold, whether the length of the polling retransmission timer on the base station side is the initial length and whether the length of the status report prohibit timer on the base station side is the initial length need to be detected. Then, the length, of the polling retransmission timer on the base station side, that is not the initial length is set to the initial length of the polling retransmission timer, and the length, of the status report prohibit timer on the base station side, that is not the initial length is set to the initial length of the status report prohibit timer.

It should be noted that, the foregoing several cases are only used as examples for description. Another possible implementation case also falls within the protection scope of the present invention, and this is not specifically limited herein.

In this embodiment, a base station adjusts a parameter of an RLC timer on a base station side according to a quantity of UE in a network, and this makes a length of the RLC timer on the base station side more adaptive to a network condition, avoids invalid RLC retransmission and status report sending, and reduces radio resource consumption.

Figure 4:
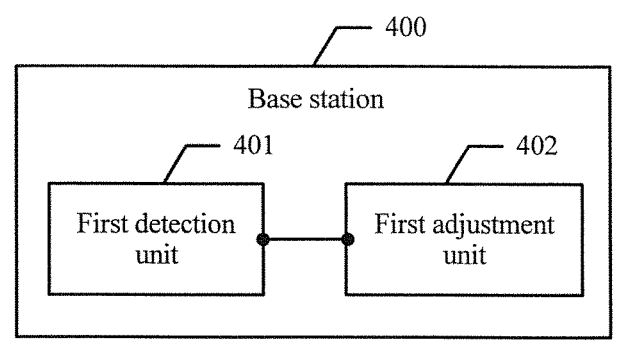
FIG. 4 is a schematic diagram of an embodiment of a base station according to the present invention.

Referring to FIG. 4, a base station 400 in this embodiment includes:

a first detection unit 401, configured to detect whether a quantity of accessing user equipments UE in a cell exceeds a preset quantity threshold; and a first adjustment unit 402, configured to: increase a length of a Radio Link Control RLC timer by a preset increment when the quantity of accessing UEs exceeds the preset quantity threshold.

In this embodiment, a first adjustment unit adjusts a parameter of an RLC timer according to a quantity of UE in a network, and this can avoid a radio resource waste and reduce a UE call drop risk.

Figure 5:
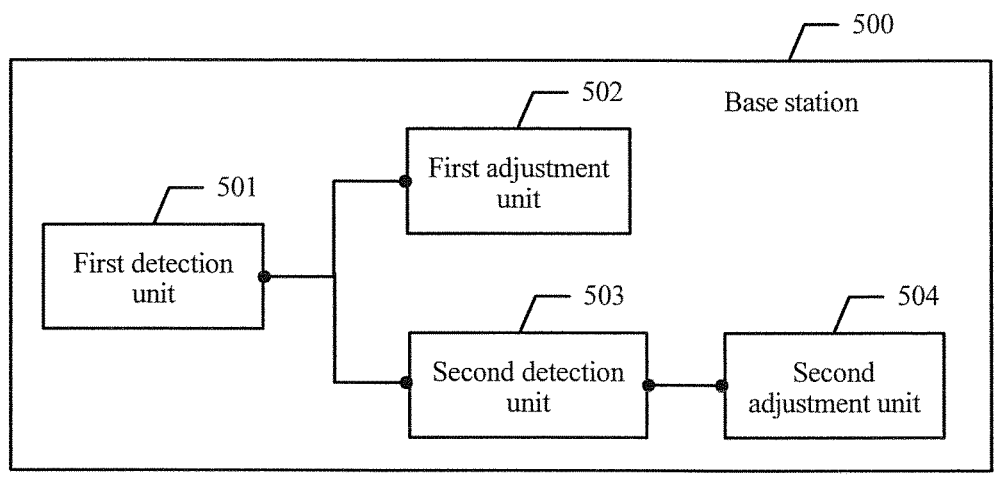
FIG. 5 is a schematic diagram of another embodiment of a base station according to the present invention.

For ease of understanding, the following describes the base station in the present invention by using a specific embodiment. Referring to FIG. 5, a base station 500 in this embodiment includes:

a first detection unit 501, configured to detect whether a quantity of accessing user equipments UE in a cell exceeds a preset quantity threshold;

a first adjustment unit 502, configured to: increase a length of a Radio Link Control RLC timer by a preset increment when the quantity of accessing UEs exceeds the preset quantity threshold;

a second detection unit 503, configured to: when the quantity of accessing UEs does not exceed the preset quantity threshold, detect whether the length of the RLC timer is an initial length; and a second adjustment unit 504, configured to: when the length of the RLC timer is not the initial length, set the length of the RLC timer to the initial length of the RLC timer.

To provide further understanding of the base station in this embodiment, the following describes an interaction process between each unit in the base station 500 in this embodiment by using a specific embodiment, which is specifically as follows:

In a phase that the UE performs SRB or DRB transmission, the first detection unit 501 detects whether the quantity of accessing UEs in the cell exceeds the preset quantity threshold; and if exceeds, the first adjustment unit 502 increases the length of the RLC timer by the preset increment.

The RLC timer in this embodiment is a polling retransmission timer on a base station side, and/or a status report prohibit timer on the base station side, and/or a polling retransmission timer on a UE side, and/or a status report prohibit timer on the UE side. The preset increment may be any value within a difference range between a maximum length specified in the protocol and a current length of the RLC timer. Preset increments increased for timers may be a same value or may be different values. After being increased by the preset increment, a length of each timer is still within the maximum length range specified in the protocol.

A preset increment of a length of the polling retransmission timer on the base station side and a preset increment of a length of the status report prohibit timer on the base station side are directly configured by the first adjustment unit 502. A preset increment of a length of the polling retransmission timer on the UE side and a preset increment of a length of the status report prohibit timer on the UE side are configured in a way that the first adjustment unit 502 sends an RRC redefinition message to the UE, and after receiving the message, the UE extracts a parameter, of the RLC timer on the UE side, carried in the message to perform configuration.

In addition, if the quantity of accessing UEs in the cell does not exceed the preset quantity threshold, the second detection unit 503 detects whether the length of the RLC timer is the initial length. If yes, adjustment ends; or if no, it indicates that before this adjustment, the first adjustment unit 502 has adjusted the length of the RLC timer, and the second adjustment unit 504 restores the length of the RLC timer to the initial length.

In this embodiment, a first adjustment unit increases a length of an RLC timer by a preset increment when a quantity of accessing UEs is greater than a preset quantity threshold. Otherwise, when the length of the RLC timer is not an initial length, a second adjustment unit sets the length of the RLC timer to the initial length. That is, a parameter of an RLC timer on a base station side and/or a UE side in this embodiment is adaptively adjusted according to the quantity of UE in a network. Therefore, the length of the RLC timer can be more adaptive to a network condition, and this avoids invalid RLC retransmission and status report sending, reduces radio resource consumption, and increases a network throughput. Further, a UE call drop because RLC retransmission is performed for the maximum times can be avoided.

Figure 6:
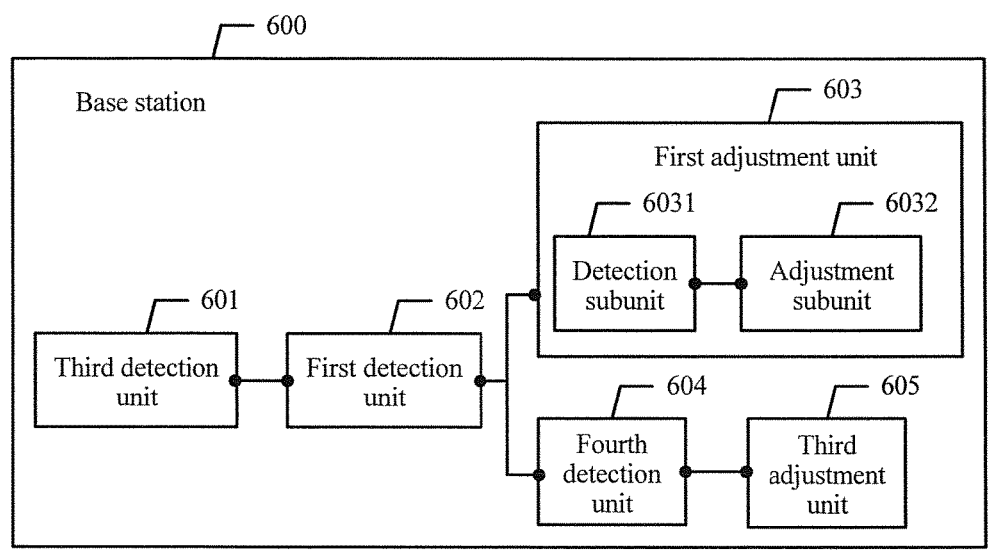
FIG. 6 is a schematic diagram of still another embodiment of a base station according to the present invention.

The following introduces another embodiment of the base station in the present invention. Referring to FIG. 6, a base station 600 in this embodiment includes:

a third detection unit 601, configured to detect whether a polling retransmission timer on a base station side is in a timeout state, and/or detect whether a length of a status report prohibit timer on the base station side is shorter than an uplink scheduling time interval;

a first detection unit 602, configured to: when the polling retransmission timer on the base station side is in the timeout state, and/or the length of the status report prohibit timer on the base station side is shorter than the uplink scheduling time interval, detect whether a quantity of accessing UEs exceeds a preset quantity threshold;

a first adjustment unit 603, configured to: increase a length of an RLC timer by a preset increment when the quantity of accessing UEs exceeds the preset quantity threshold;

a fourth detection unit 604, configured to: when the quantity of accessing UEs does not exceed the preset quantity threshold, detect whether a length of the polling retransmission timer on the base station side is an initial length, and/or detect whether the length of the status report prohibit timer on the base station side is an initial length; and a third adjustment unit 605, configured to: when the length of the polling retransmission timer on the base station side is not the initial length, and/or the length of the status report prohibit timer on the base station side is not the initial length, set the length of the polling retransmission timer on the base station side to the initial length of the polling retransmission timer, and/or set the length of the status report prohibit timer on the base station side to the initial length of the status report prohibit timer.

In addition, the first adjustment unit 603 includes a detection subunit 6031 and an adjustment subunit 6032.

The detection subunit 6031 is configured to: when the quantity of accessing UEs exceeds the preset quantity threshold, detect whether a length of the polling retransmission timer on the base station side reaches a maximum adjustment threshold, and/or detect whether the length of the status report prohibit timer on the base station side reaches the maximum adjustment threshold; and the adjustment subunit 6032 is configured to: when the length of the polling retransmission timer on the base station side does not reach the maximum adjustment threshold, and/or the length of the status report prohibit timer on the base station side does not reach the maximum adjustment threshold, increase the length of the polling retransmission timer on the base station side by a first preset increment, and/or increase the length of the status report prohibit timer on the base station side by a second preset increment.

In this embodiment, a third detection unit 601 is added and configured to detect a length status of an RLC timer on a base station side, thereby making an adjustment granularity more precise, and making adjustment to the RLC timer more adaptive to a current status requirement of a base station.

In specific implementation, optionally, the third detection unit 601 detects that the polling retransmission timer on the base station side is in the timeout state. If the first detection unit 602 in this case detects that the quantity of accessing UEs exceeds the preset quantity threshold, the detection subunit 6031 detects whether the length of the polling retransmission timer on the base station side reaches a maximum threshold. If the maximum threshold is not reached, the adjustment subunit 6032 increases the length of the polling retransmission timer on the base station side by the first preset increment. If the first detection unit 602 in this case detects that the quantity of accessing UEs does not exceed the preset quantity threshold, the fourth detection unit 604 detects whether the length of the polling retransmission timer on the base station side is the initial length. If no, the third adjustment unit 605 sets the length of the polling retransmission timer on the base station side to the initial length of the polling retransmission timer.

Optionally, the third detection unit 601 detects that the length of the status report prohibit timer on the base station side is shorter than the uplink scheduling time interval. If the first detection unit 602 in this case detects that the quantity of accessing UEs exceeds the preset quantity threshold, the detection subunit 6031 detects whether the length of the status report prohibit timer on the base station side reaches the maximum threshold. If the maximum threshold is not reached, the adjustment subunit 6032 increases the length of the status report prohibit timer on the base station side by the second preset increment. If the first detection unit 602 in this case detects that the quantity of accessing UEs does not exceed the preset quantity threshold, the fourth detection unit 604 detects whether the length of the status report prohibit timer on the base station side is the initial length. If no, the third adjustment unit 605 sets the length of the status report prohibit timer on the base station side to the initial length of the status report prohibit timer.

Optionally, the third detection unit 601 detects that the polling retransmission timer on the base station side is in the timeout state and the length of the status report prohibit timer on the base station side is shorter than the uplink scheduling time interval. If the first detection unit 602 in this case detects that the quantity of accessing UEs exceeds the preset quantity threshold, the detection subunit 6031 needs to detect whether the length of the polling retransmission timer on the base station side exceeds the maximum threshold and whether the length of the status report prohibit timer on the base station side reaches the maximum threshold. Then, the adjustment subunit 6032 increases the length, of the polling retransmission timer on the base station side, that does not reach the maximum threshold by the first preset increment, and increases the length, of the status report prohibit timer on the base station side, that does not reach the maximum threshold by the second preset increment. If the first detection unit 602 in this case detects that the quantity of accessing UEs does not exceed the preset quantity threshold, the fourth detection unit 604 needs to detect whether the length of the polling retransmission timer on the base station side is the initial length and whether the length of the status report prohibit timer on the base station side is the initial length. Then, the third adjustment unit 605 sets the length, of the polling retransmission timer, that is not the initial length to the initial length of the polling retransmission timer, and sets the length, of the status report prohibit timer, that is not the initial length to the initial length of the status report prohibit timer.

It should be noted that, the foregoing several cases are only used as examples for description. Another possible implementation case also falls within the protection scope of the present invention, and this is not specifically limited herein.

In addition, the foregoing apparatus may be further configured to implement other functions in the foregoing method embodiments, and details are not described herein. For details, reference may be made to description of the foregoing method embodiments.

In this embodiment, a parameter of an RLC timer on a base station side is adjusted according to a quantity of UE in a network, and this makes a length of the RLC timer on the base station side more adaptive to a network condition, avoids invalid RLC retransmission and status report sending, and reduces radio resource consumption.

Figure 7:
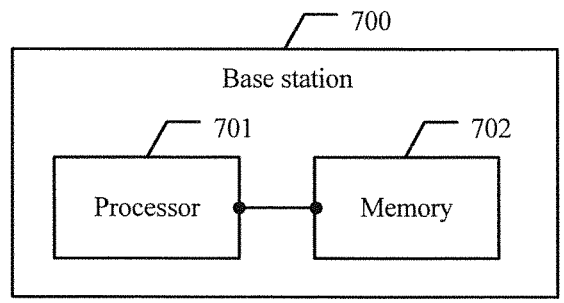
FIG. 7 is a schematic diagram of yet another embodiment of a base station according to the present invention.

The following introduces another embodiment of the base station in the present invention. Referring to FIG. 7, a base station 700 in this embodiment includes a processor 701 and a memory 702. The memory 702 is configured to store a program instruction, and the processor 701 is configured to invoke the program instruction stored in the memory 702 to execute the following operations:

detecting whether a quantity of accessing user equipments UE in a cell exceeds a preset quantity threshold; and increasing a length of a Radio Link Control RLC timer by a preset increment when the quantity of accessing UEs exceeds the preset quantity threshold.

Optionally, operations executed by the processor 701 further include:

when the quantity of accessing UEs does not exceed the preset quantity threshold, detecting whether the length of the RLC timer is an initial length; and when the length of the RLC timer is not the initial length, setting the length of the RLC timer to the initial length of the RLC timer.

Optionally, the RLC timer is a polling retransmission timer on a base station side, and/or the RLC timer is a status report prohibit timer on the base station side, and/or the RLC timer is a polling retransmission timer on a UE side, and/or the RLC timer is a status report prohibit timer on the UE side.

Optionally, when the RLC timer is the polling retransmission timer on the base station side, and/or the RLC timer is the status report prohibit timer on the base station side, operations executed by the processor further include:

detecting whether the polling retransmission timer on the base station side is in a timeout state, and/or detecting whether a length of the status report prohibit timer on the base station side is shorter than an uplink scheduling time interval; and if the polling retransmission timer on the base station side is in the timeout state, and/or the length of the status report prohibit timer on the base station side is shorter than the uplink scheduling time interval, detecting whether the quantity of accessing UEs exceeds the preset quantity threshold.

Optionally, increasing, by the processor, a length of an RLC timer by a preset increment when the quantity of accessing UEs exceeds the preset quantity threshold includes:

when the quantity of accessing UEs exceeds the preset quantity threshold, detecting, by the processor, whether a length of the polling retransmission timer on the base station side reaches a maximum adjustment threshold, and/or detecting whether the length of the status report prohibit timer on the base station side reaches the maximum adjustment threshold; and if the length of the polling retransmission timer on the base station side does not reach the maximum adjustment threshold, and/or the length of the status report prohibit timer on the base station side does not reach the maximum adjustment threshold, increasing the length of the polling retransmission timer on the base station side by a first preset increment, and/or increasing the length of the status report prohibit timer on the base station side by a second preset increment.

Optionally, a length obtained after the length of the polling retransmission timer on the base station side is increased by the first preset increment does not exceed the maximum adjustment threshold, and a length obtained after the length of the status report prohibit timer on the base station side is increased by the second preset increment does not exceed the maximum adjustment threshold.

Optionally, operations executed by the processor further include:

when the quantity of accessing UEs does not exceed the preset quantity threshold, detecting whether a length of the polling retransmission timer on the base station side is an initial length, and/or detecting whether the length of the status report prohibit timer on the base station side is an initial length; and if the length of the polling retransmission timer on the base station side is not the initial length, and/or the length of the status report prohibit timer on the base station side is not the initial length, setting the length of the polling retransmission timer on the base station side to the initial length of the polling retransmission timer, and/or setting the length of the status report prohibit timer on the base station side to the initial length of the status report prohibit timer.

In addition, it should be noted that, the base station 700 may be further configured to implement other functions in the foregoing method embodiments, and details are not described herein. For details, reference may be made to description of the foregoing method embodiments.

In this embodiment, a processor adjusts a parameter of an RLC timer according to a quantity of UE in a network, and this makes a length of the RLC timer more adaptive to a network condition, avoids invalid RLC retransmission and status report sending, and reduces radio resource consumption.

In the several embodiments provided in the present application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a read-only memory (ROM), a random access memory (RAM), a removable hard disk, a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for adjusting a length of a timer, the method comprising:
    detecting, by a base station, whether a quantity of accessing user equipments (UEs) in a cell exceeds a preset quantity threshold;
    when the quantity of accessing UEs exceeds the preset quantity threshold, increasing, by the base station, a length of a Radio Link Control (RLC) timer by a preset increment;
    when the quantity of accessing UEs does not exceed the preset quantity threshold, detecting, by the base station, whether the length of the RLC timer is an initial length; and
    when the length of the RLC timer is not the initial length, setting, by the base station, the length of the RLC timer to the initial length of the RLC timer.

2. The method according to claim 1, wherein the RLC timer comprises at least one of:
    a polling retransmission timer for the base station;
    a status report prohibit timer for the base station;
    a polling retransmission timer for a UE; or
    a status report prohibit timer for a UE.

3. The method according to claim 2, wherein when the RLC timer is at least one of the polling retransmission timer for the base station, or the status report prohibit timer for the base station, the method further comprises:
    at least one of detecting whether the polling retransmission timer for the base station is in a timeout state, or detecting whether a length of the status report prohibit timer for the base station is shorter than an uplink scheduling time interval; and
    if at least one of the polling retransmission timer for the base station is in the timeout state, or the length of the status report prohibit timer for the base station is shorter than the uplink scheduling time interval, detecting whether the quantity of accessing UEs exceeds the preset quantity threshold.

4. The method according to claim 3, wherein increasing the length of a Radio Link Control (RLC) timer by the preset increment when the quantity of accessing UEs exceeds the preset quantity threshold comprises:
when the quantity of accessing UEs exceeds the preset quantity threshold, at least one of detecting whether a length of the polling retransmission timer for the base station reaches a maximum adjustment threshold, or detecting whether the length of the status report prohibit timer for the base station reaches the maximum adjustment threshold; and
if at least one of the length of the polling retransmission timer for the base station does not reach the maximum adjustment threshold, or the length of the status report prohibit timer for the base station does not reach the maximum adjustment threshold, at least one of increasing the length of the polling retransmission timer for the base station by a first preset increment, or increasing the length of the status report prohibit timer for the base station by a second preset increment.

5. The method according to claim 3, further comprising:
when the quantity of accessing UEs does not exceed the preset quantity threshold, detecting at least one of whether a length of the polling retransmission timer for the base station is an initial length, or whether the length of the status report prohibit timer for the base station is an initial length; and
if at least one of the length of the polling retransmission timer for the base station is not the initial length, or the length of the status report prohibit timer for the base station is not the initial length, at least one of setting the length of the polling retransmission timer for the base station to the initial length of the polling retransmission timer, or setting the length of the status report prohibit timer for the base station to the initial length of the status report prohibit timer.

6. The method according to claim 4, wherein:
a length obtained after the length of the polling retransmission timer for the base station is increased by the first preset increment does not exceed the maximum adjustment threshold; and
a length obtained after the length of the status report prohibit timer for the base station is increased by the second preset increment does not exceed the maximum adjustment threshold.

7. A base station, comprising:
a processor; and
a memory configured to store program instructions which, when executed by the processor, cause the processor to:
detect whether a quantity of accessing user equipments (UEs) in a cell exceeds a preset quantity threshold; and
when the quantity of accessing UEs exceeds the preset quantity threshold, increase a length of a Radio Link Control (RLC) timer by a preset increment;
when the quantity of accessing UEs does not exceed the preset quantity threshold, detect whether the length of the RLC timer is an initial length; and
when the length of the RLC timer is not the initial length, set the length of the RLC timer to the initial length of the RLC timer.

8. The base station according to claim 7, wherein the RLC timer comprises at least one of:
a polling retransmission timer for the base station;
a status report prohibit timer for the base station;
a polling retransmission timer for a UE; or
a status report prohibit timer for a UE.

9. The base station according to claim 8, wherein when the RLC timer is at least one of the polling retransmission timer for the base station, or the status report prohibit timer for the base station, the program instructions, when executed by the processor, further cause the processor to:
at least one of detect whether the polling retransmission timer for the base station is in a timeout state, or detect whether a length of the status report prohibit timer for the base station is shorter than an uplink scheduling time interval; and
if at least one of the polling retransmission timer for the base station is in the timeout state, or the length of the status report prohibit timer for the base station is shorter than the uplink scheduling time interval, detect whether the quantity of accessing UEs exceeds the preset quantity threshold.

10. The base station according to claim 9, wherein the program instructions, when executed by the processor, further cause the processor to:
when the quantity of accessing UEs exceeds the preset quantity threshold, at least one of detect whether a length of the polling retransmission timer for the base station reaches a maximum adjustment threshold, or detect whether the length of the status report prohibit timer for the base station reaches the maximum adjustment threshold; and
if at least one of the length of the polling retransmission timer for the base station does not reach the maximum adjustment threshold, or the length of the status report prohibit timer for the base station does not reach the maximum adjustment threshold, at least one of increase the length of the polling retransmission timer for the base station by a first preset increment, or increase the length of the status report prohibit timer for the base station by a second preset increment.

11. The base station according to claim 9, wherein the program instructions, when executed by the processor, further cause the processor to:
when the quantity of accessing UEs does not exceed the preset quantity threshold, detect at least one of whether a length of the polling retransmission timer for the base station is an initial length, or whether the length of the status report prohibit timer for the base station is an initial length; and
if at least one of the length of the polling retransmission timer for the base station is not the initial length, or the length of the status report prohibit timer for the base station is not the initial length, at least one of set the length of the polling retransmission timer for the base station to the initial length of the polling retransmission timer, or set the length of the status report prohibit timer for the base station to the initial length of the status report prohibit timer.

12. The base station according to claim 10, wherein:
a length obtained after the length of the polling retransmission timer for the base station is increased by the first preset increment does not exceed the maximum adjustment threshold; and
a length obtained after the length of the status report prohibit timer for the base station is increased by the second preset increment does not exceed the maximum adjustment threshold.

* * * * *